Sept. 6, 1955     E. L. BAUGH ET AL     2,716,995

VALVE FOR REVERSIBLE FLUID PUMP

Filed Sept. 23, 1950

INVENTORS
EVERETT L. BAUGH AND
DELOSS D. WALLACE

BY *Willis, Hardman and Fisher*

THEIR ATTORNEYS

United States Patent Office 2,716,995
Patented Sept. 6, 1955

2,716,995

VALVE FOR REVERSIBLE FLUID PUMP

Everett L. Baugh and De Loss D. Wallace, Dayton, Ohio, assignors to General Motors Corporation, Detroit, Mich., a corporation of Delaware Application September 23, 1950, Serial No. 186,396

3 Claims. (Cl. 137—87)

This invention relates to improvements in flow control mechanism for fluid power transmission devices of the reversible type.

The transmission device of the type disclosed in this invention comprises a reversible fluid pump driven by a power device and connected in a closed circuit with one or more fluid motors of the cylinder-piston type. Due to the presence of the piston rod in one of the two working chambers of the fluid motor the fluid displacement within the cylinder at opposite sides of the piston is unequal per unit of piston movement. In a closed circuit system this must be compensated for.

It is therefore among the objects of the present invention to provide a valve structure connected in circuit with a reversible flow, fluid power transmission device, operative to connect the pump and motor to a fluid reservoir for either receiving the excess or supplying the necessary replenishing amounts of fluid respectively to compensate for the differential displacement of the two working chambers of the fluid motor.

A further object of the present invention is to provide a compensating valve of simple structure and design which will operate efficiently and which may be produced commercially at a minimum expense.

Further objects and advantages of the present invention will be apparent from the following description, reference being had to the accompanying drawings, wherein a preferred embodiment of the present invention is clearly shown.

Figure 1:
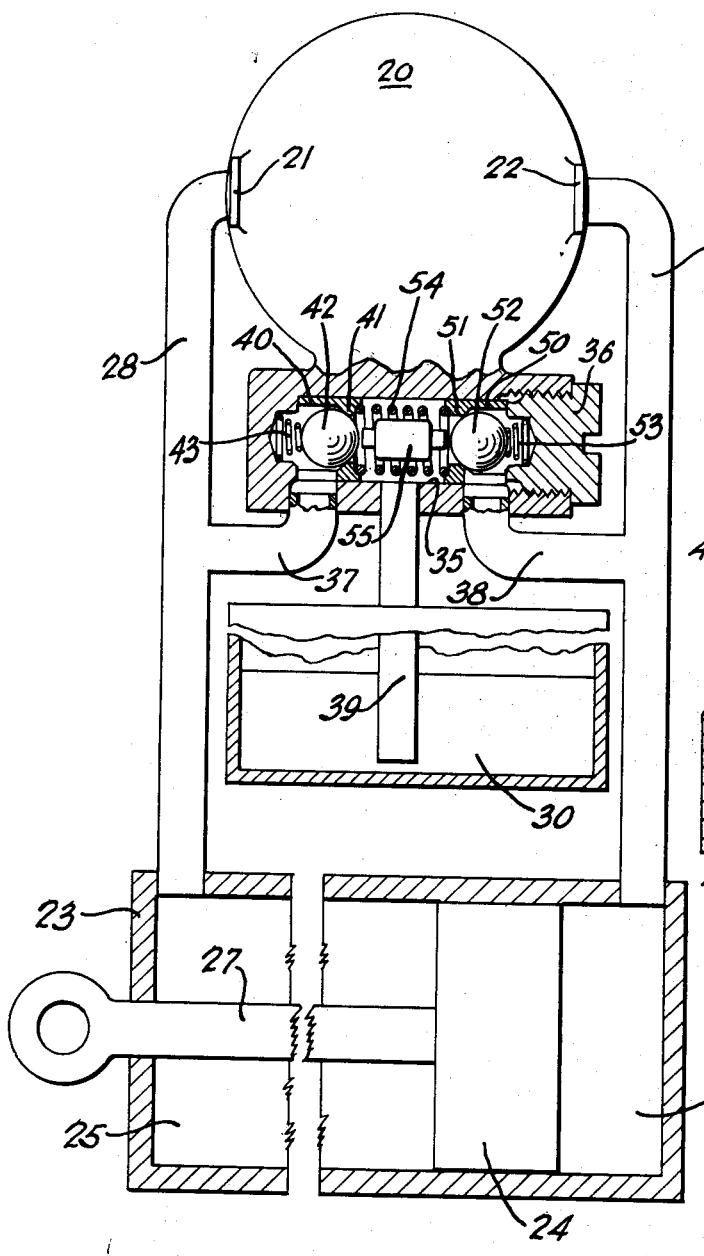
Fig. 1 is a diagrammatic view of a fluid power transmission device equipped with the valve mechanism of the present invention.

Referring to the drawings and particularly Fig. 1, the power transmission comprises a reversible pump 20 driven by any suitable power device such as an electric motor, not shown in the present drawings. The pump has two ports 21 and 22. When operating in one direction the pump port 21 acts as the fluid discharge port and the pump port 22 as the fluid intake port. When operating in the opposite direction port 22 acts as the fluid discharge port and port 21 acts as the fluid intake port. In the present device the pump 20 delivers fluid under pressure to a double acting fluid motor shown in the present drawings as a cylinder-piston type. This fluid motor comprises a cylinder 23 in which a piston 24 forms two working chambers 25 and 26. A piston rod 27 secured to the piston 24 extends through the working chamber 25 to the outside of the cylinder and may be attached to any device to be actuated. The port 21 of the pump 20 communicates with the working chamber 25 through a conduit 28. Another conduit 29 provides communication between the pump port 22 and the working chamber 26 of the fluid motor. A fluid reservoir 30 is provided for the system, this fluid reservoir being adapted to receive or supply excess or necessary replenishing amounts of fluid respectively to compensate for the differential displacement of the two working chambers 25 and 26 caused by the presence of the rod 27 in the working chamber 25 and thus making this working chamber 25 of less fluid capacity per unit of piston movement than the chamber 26.

As has been stated the differential displacement of the two working chambers of the fluid motor is compensated for by a fluid flow control mechanism forming the subject matter of the present invention. This fluid flow controlling mechanism is contained within a bore 35 preferably provided in the housing portion of the pump 20. One end of this bore is closed, the open end of the bore being closable by a plug 36 threaded into this open end of the said bore. The one end of bore 35 is in communication with duct 28 through a branch duct 37 while a similar branch duct 38 provides communication between the conduit 29 and the opposite end of the bore 35. The intermediate portion of the bore 35 is in constant and uninterrupted communication with the reservoir 30 by means of the conduit 39.

Two separate, normally disconnected but interdependent compound valves are housed within the bore 35. The one valve comprises a sleeve 40 slidable in the bore 35 and having an inwardly extending annular flange 41 providing a seat for the ball check valve 42 normally urged upon the seat in sleeve portion 40 by a spring 43 interposed between the one end of the bore 35 and the ball 42. The other compound valve mechanism comprises a similar sleeve 50 having an inwardly extending annular flange 51 providing a seat engageable by the ball 52 under effect of the spring 53 interposed between the ball 52 and the opposite closed end of the bore 35, in this instance the screw plug 36. Both sleeve valve members 40 and 50 are urged against their respective ends of the bore 35 by a common spring 54 interposed between said sleeve valves. A floating pusher pin 55, within the coil spring 54, is interposed between the two ball check valves 42 and 52 of the compound valves, said pusher pin normally being disengaged from both valves. The two springs 43 and 53 which yieldably maintain the respective balls 42 and 52 upon the seats of their associated sleeve valves 40 and 50 respectively are substantially weaker than the coil spring 54 thus both sleeve valve portions are maintained in engagement with their respective ends of the bore while the balls 42 and 52 are yieldably maintained in seating engagement with their respective sleeve valve portions. Thus under normal conditions the compound valve including sleeve portion 40 and ball check valve 42 shuts off communication between the branch passage or duct 37 and the intermediate portion of the bore communicating with the fluid reservoir. In a like manner the compound valve including sleeve 50 and ball check valve 52 shuts off communication between the passage 38 and the intermediate portion of the bore 35 and fluid reservoir 30. Normally, as has been mentioned, the pusher pin 55 between ball check valves 42 and 52 engages neither valve. However, this pusher pin is operative mechanically to connect the two compound valves so that under certain conditions one compound valve opens the other compound valve and if excessive pressures are present, said pusher pin will cause both compound valves to be opened.

*Operation*

Assuming that the operator desires to actuate the fluid motor piston 24 to the left as regards Fig. 1 of the drawings, he activates his power device, for instance an electric motor, so that it drives the pump 20 in a direction in which the port 22 becomes the fluid discharge port and the port 21 becomes the fluid intake port. Both chambers 25 and 26 of the fluid motor are filled with fluid as well as conduits 28 and 29. The pump 20 discharging fluid from its port 22 under pressure will cause fluid pressure in the branch conduit 38 to be exerted against the rear end portion of the compound valve including the ball check 52 and the sleeve 50 which has its skirt portion slotted to permit the fluid to flow from conduit 38 into the space behind this compound valve. Thus the conduits 29 and 38 as well as the fluid chamber 26 become the high pressure side of the device during this operation. Pump port 21, being the intake port, thus causes the conduits 28 and 37 as well as the fluid motor chamber 25 to become the low pressure side of the system during this operation. Now fluid will be drawn by the pump from the working chamber 25 of the fluid motor through conduit 28 into the pump through the intake port 21, the pump then discharging fluid under pressure from the port 22 through conduit 29 into the working chamber 26 of the fluid motor, thus causing the piston 24 in said fluid motor to be urged toward the left. It will be seen that due to the fluid displacement in chamber 25 by the piston rod 27 an insufficient amount of fluid is contained in and taken from chamber 25 to supply the working chamber 26 of the pump which is larger due to the absence of a fluid displacement rod in this chamber and therefore an additional or compensating amount of fluid must be added so that the chamber 26 of the fluid pump will be properly filled. This additional supply of fluid is provided by the compensating valve mechanism in the following manner: Pressure in the conduits 29 and 38 directed against the compound valve mechanism including sleeve 50 and ball 52 will move this compound valve as a unit toward the left against the effect of the coil spring 54, thus causing the ball 52 of this compound valve to engage the pusher pin 55 and urge it toward the left to engage the ball 42, continued movement of the ball 52 and pusher pin 55 toward the left moving the ball 42 against the effect of spring 43 from seating engagement with its associated sleeve 40 thereby opening communication between the conduits 39 and 37 via bore 35. In addition to the valve 42 being moved from closing engagement with its cooperating sleeve 40 by fluid pressure against valve 50—52 suction in conduits 28 and 37 will be effective to attain the same result. This is particularly advantageous as it provides a means whereby the pump may initially be primed when the conduit 28 is on the low side and suction moves ball 42 from closing engagement with its sleeve 40 thereby connecting the fluid reservoir 30 through passage 39 and bore 35 to supply the priming fluid. When the conduit 29 is on the low side during priming, the ball 52 will be moved by suction to open sleeve 50 and thus connect the source of fluid supply with conduit 29 for such priming purposes. By these arrangements fluid from the reservoir 30 will flow through the conduit 39 into the intermediate portion of the bore 35 with which it is in uninterrupted communication, the fluid then flowing through the sleeve 40 past the ball 42, conduit 37 and join the fluid flowing through the conduit 28 from the chamber 25 of the fluid motor to the intake port 21 of the pump. This additional or replenishing supply of fluid will therefore cause the working chamber 26 of the fluid motor to be properly filled as the piston 24 in said motor is moved toward the left. If for any reason excessive pressures should be built up in the conduits 29 and 38 the compound valves 50—52 will be urged farther toward the left in which case the sleeve 50 of the compound valve will be moved relatively to its engaging ball check valve member 52 inasmuch as said ball having pushed the pusher pin and ball 42 toward the left as far as it can will not be able to move in this direction and therefore sleeve 50 in response to excessive pressure must move relatively thereto. This permits the fluid to flow from conduit 38 through sleeve 50 and join the fluid flowing to the intake port thereby merely circulating the fluid from the pump through conduits 29—38, valve bore 35 and back to the intake side of the pump via the conduits 37 and 28.

When the fluid motor is to be operated in the opposite direction, that is, its piston 24 to be moved toward the right as regards Fig. 1 the power drive is caused to operate in the reverse direction driving the pump 20 so that its port 21 becomes the fluid discharge port and 22 the intake port. Now fluid is drawn from the working chamber 26 through conduit 29, port 22 into the pump and delivered thereby under pressure from discharge port 21 through conduit 28 into the working chamber 25 of the fluid motor. Again the fluid displacement of the rod 27 requires compensation inasmuch as all the fluid taken from chamber 26 cannot be received by the rod containing chamber 25 and therefore an excess amount of fluid being taken from the chamber 26 must be compensated for. As fluid pressure is exerted through conduit 28 into conduit 37 the compound valve including sleeve 40 and ball check valve 42 will be moved as a unit toward the right as regards the Fig. 1 against the effect of spring 54 thereby causing the ball 42 to engage floater pin 55, move it into engagement with ball check valve 52 and move said valve toward the right against the screw plug 36 thereby unseating said ball check valve 52 from its associated valve sleeve 50 and opening the passage between conduits 38 and 39 via the bore 35. Now the excess fluid discharged from working chamber 26 of the fluid motor may enter the conduit 38 pass through the open compound valve including ball 52 and sleeve 50 through the intermediate portion of the bore 35 and return to the reservoir via the conduit 39. If in this instance excessive pressures are built up in the conduits 28 and 37 sleeve 40 will be moved relatively to the now immovable ball check valve portion 42 to unseat the ball from the sleeve and thereby open communications between the duct 37 and the intermediate portion of the bore 35 permitting circulation of the fluid from the pump to conduit 28 compensating valve mechanism through conduit 29 back again to the pump. The spring 54 is so designed and constructed that it will resist movement of the sleeves 40 and 50 relatively to their associated balls 42 and 52 respectively up to a predetermined degree at which time the excessive pressure of predetermined degree will actuate the valves to pop-off position as just described.

Figure 2:
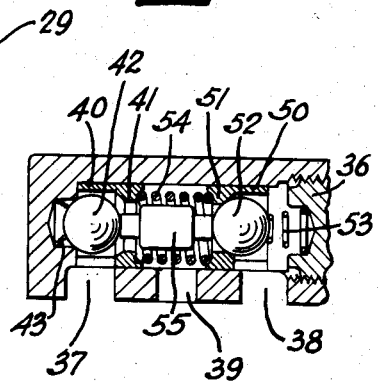
Fig. 2 is a fragmentary view of the flow control mechanism during normal operation of the fluid pump in one direction.
Figure 3:
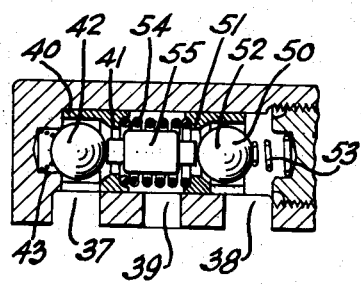
Fig. 3 is a view similar to Fig. 2 showing the flow control mechanism in the excess pressure relieving or pop-off position.

It will be noted that the Fig. 1 of the drawings shows the compensating valve mechanism in normal inoperative position in which the two separate but independent compound valves are both in complete passage closing position and not mechanically connected one to the other. For the sake of simplicity and to reduce costs, one spring 54 is interposed between the two sleeve valve portions 40 and 50. It may clearly be seen that two separate springs may be used each interposed between an anchor flange provided in the bore 35 and a respective sleeve, this construction would function in the same manner. The Fig. 2 shows the valve mechanism in the normal operating position in which the compound valve including sleeve 40 and ball 42 is opened to permit fluid flow from the reservoir through the valve mechanism into the conduit 37 and the Fig. 3 illustrates the valve mechanism in the pop-off or excess pressure relieving position in which both compound valves are completely open to relieve the excessive pressure by setting up a fluid circulating flow through the pump and compensating valve mechanism.

From the aforegoing it will be seen that applicant has provided a valve mechanism of simple structure and design which may be produced commercially at a minimum cost of time and material said valve mechanism comprising two separate but interdependent compound valves, one being mechanically actuated by the other under normal operating conditions, a portion of one cooperating with another portion of the other to permit the portion under excessive fluid pressure to be actuated to relieve said excessive pressure.

While the embodiment of the present invention as herein disclosed, constitutes a preferred form, it is to be understood that other forms might be adopted.

What is claimed is as follows:

1. A control valve consisting of a housing providing a valve chamber having three ports communicating therewith; two compound valves in said chamber normally shutting off communication between said ports, each valve having two spring located interfitting parts; a floating plunger between said two valves operative by the unitary movement of one of said valves upon engagement of said plunger by said valve to engage and separate the interfitting parts of the other valve to connect thereby two of said ports through the valve chamber, said plunger separating the two interfitting parts of the closed valve engaged thereby in response to pressure exceeding said predetermined pressure, to connect all three ports through the valve chamber.

2. A control valve consisting of a housing providing a valve chamber and three communicating ports; two oppositely disposed valves in said chamber, each consisting of a sleeve slidable within said chamber and providing a valve seat and a ball valve engageable with the valve seat of the sleeve to close the sleeve; a common spring between said sleeves urging each sleeve against a respective end of the housing, each sleeve having opening means to provide communication between a respective port and the interior of the sleeve; springs interposed between the ends of the valve chamber and the ball in the sleeve engaging a respective end of the chamber urging the ball to engage and close the sleeve; and a single, floating pin between the balls of both valves, said pin being engageable by the ball of the one valve as the valve is moved as a unit under the influence of a predetermined fluid pressure, to engage the ball of the other valve and move it to open its sleeve, said pin holding the ball of said one valve to permit movement of its engaging sleeve to open said one valve in response to fluid pressure exceeding said predetermined pressure.

3. A control valve consisting of a housing providing a valve chamber and three ports communicating with the ends and intermediate portion of said chamber respectively; two oppositely disposed check valves in said chamber normally shutting off communication between the two end ports and the intermediate port, each valve consisting of a sleeve slidable in the chamber and providing a valve seat and a ball valve resiliently urged upon the valve seat in the sleeve for closing the sleeve, each sleeve having opening means to connect the port thereadjacent with the interior of the sleeve; a spring interposed between said sleeves for urging each sleeve toward and against a respective end of the valve chamber; and a floating pin between the balls of said valves and normally disengaged from the said valves, said pin being engageable by either valve to engage and open one valve in response to unitary movement of the other valve and to thereafter open said other valve all in response to increasing fluid pressure thereagainst first to a predetermined value and thence above the said value respectively.

References Cited in the file of this patent

UNITED STATES PATENTS

| | | |
|---|---|---|
| 1,672,561 | Ernst | June 5, 1928 |
| 1,812,587 | Ellis | June 30, 1931 |
| 2,306,469 | Rupley | Dec. 29, 1942 |
| 2,388,755 | McLeod | Nov. 13, 1945 |
| 2,401,258 | Livers | May 28, 1946 |
| 2,451,689 | Nelson | Oct. 19, 1948 |
| 2,483,312 | Clay | Sept. 27, 1949 |